No. 701,318. Patented June 3, 1902.
I. R. & W. D. FENNER.
ARTIFICIAL LIMB.
(Application filed Jan. 2, 1902.)
(No Model.)

WITNESSES:
INVENTORS
Irvin R. Fenner
W<sup>m</sup> D. Fenner
BY
Francis M. Wright
ATTORNEY.

UNITED STATES PATENT OFFICE.

IRVIN R. FENNER AND WILLIAM D. FENNER, OF SAN FRANCISCO, CALIFORNIA.

ARTIFICIAL LIMB.

SPECIFICATION forming part of Letters Patent No. 701,318, dated June 3, 1902.

Application filed January 2, 1902. Serial No. 87,993. (No model.)

*To all whom it may concern:*

Be it known that we, IRVIN R. FENNER and WILLIAM D. FENNER, citizens of the United States, residing at San Francisco, in the county of San Francisco and State of California, have invented certain new and useful Improvements in Artificial Limbs, of which the following is a specification.

Our invention relates to improvements in artificial limbs.

The object of our invention is to provide an artificial limb which can be readily adjusted, while retaining the proper contour and shape of the socket, and which shall be light, strong, and durable.

Our invention therefore resides in the novel construction, combination, and arrangement of parts for the above ends hereinafter fully specified, and particularly pointed out in the claims.

Figure 1:
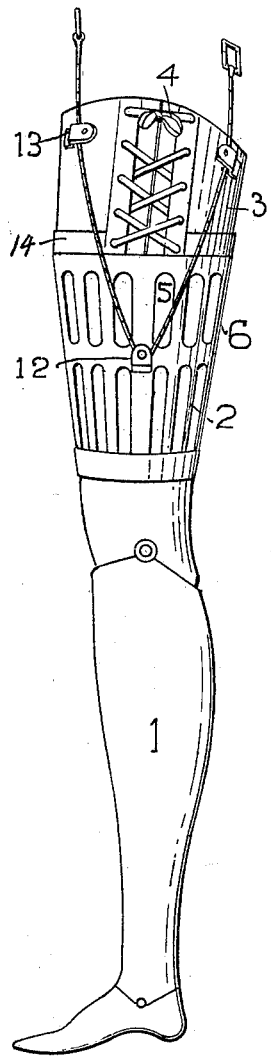
Figure 3:
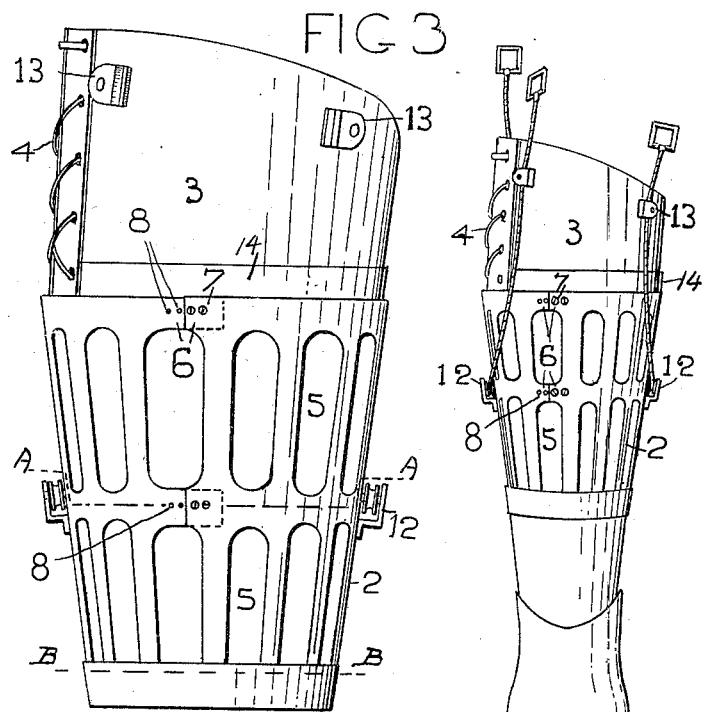
Figure 2:
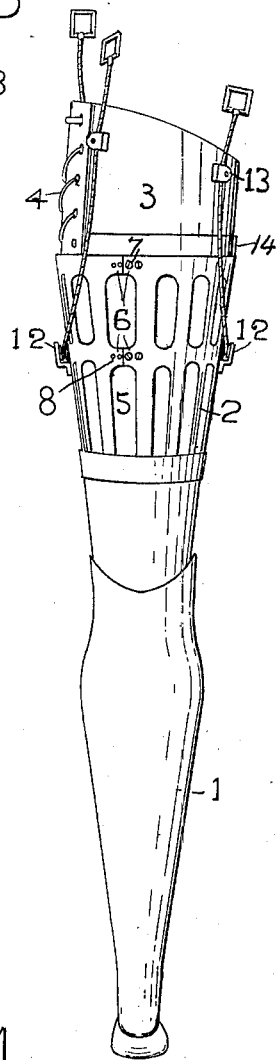
Figure 4:
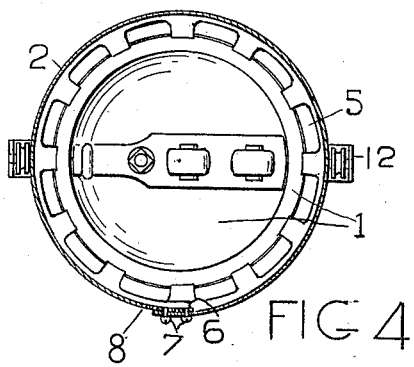
Figure 5:
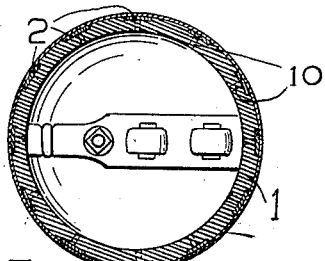

In the accompanying drawings, Figure 1 is a side elevation of an artificial limb equipped with our improvement. Fig. 2 is a rear view of the same. Fig. 3 is an enlarged rear view of the upper portion of the limb. Fig. 4 is a section on the line A A of Fig. 3, and Fig. 5 is a section on the line B B of Fig. 3.

Referring to the drawings, 1 represents an artificial limb, 2 representing the top section or thigh-piece thereof. In said thigh-piece fits a socket 3, which is made adjustable around the stump by the lacing 4. The top section or thigh-piece of the limb is composed of metal, preferably aluminium, of the shape of the frustum of a cone. It is cut out, as shown at 5, to form ribs or tines, thus affording excellent ventilation and avoiding heating of the stump and diseases thereof. Said thigh-piece is cut or separated in the rear, and the meeting edges 6 thereof are secured together by screws 7 passing through screw-holes 8 in said edges. The tines are secured at their lower ends in recesses 10 in the wooden top of the limb 1 and are surrounded by a metallic band 15 around the lower section of said limb.

The socket 3 encircling the stump rests upon the thigh-piece by means of a shoulder formed by a band 14 of leather secured around the socket and resting upon the upper edge of the thigh-piece. This arrangement leaves the socket free and easily removable, and consequently easy of adjustment.

In order to provide for the adjustment of the thigh-piece to conform to the shrinkage of the stump and the adjustment of the socket, we provide two series of holes 8, extending a short distance from the edge around the circumference of the thigh-piece, so that upon shrinkage of the stump the edges may be caused to suitably overlap, so that the circumference of the thigh-piece may be proportionately restricted.

Another feature of our invention is that the straps 11, which support the limb from the shoulders and which are attached to the thigh-piece by means of the pulleys 12, now pass around pulleys 13 on the socket instead of on the thigh-piece, as formerly. This permits the limb to be readily adjusted on the socket, so that the toe may point in any desired direction.

We claim—

1. An artificial limb having an upper section formed of a single sheet of metal bent into a frustum of a cone, said sheet being cut out so as to form an upper continuous horizontal band and a middle continuous horizontal band joined by vertical tines, the ends of said bands overlapping and being provided with means for adjustably securing the same together and the tines being secured at their lower ends in the outside of the lower section, and being surrounded by a metallic band around said lower section, substantially as described.

2. An artificial limb having its top section formed of sheet metal in the shape of a frustum of a cone, the lower edge being fixedly secured to the remainder of the limb, and the vertical meeting edges overlapping and being provided with series of screw-holes, the holes on one side being arranged to register with those on the other side whereby said top section may be adjusted, said top section having a single pulley on each side, and a socket provided with means for lacing it around the stump of the limb and having two guide-pulleys on each side, substantially as described.

In witness whereof we have hereunto set our hands in the presence of two subscribing witnesses.

I. R. FENNER.
W. D. FENNER.

Witnesses:
A. J. HENRY,
FRANCIS M. WRIGHT.